(No Model.)
W. L. GROUT & E. L. BOWERS.
DRILL OR REAMER HOLDER.
No. 376,476. Patented Jan. 17, 1888.
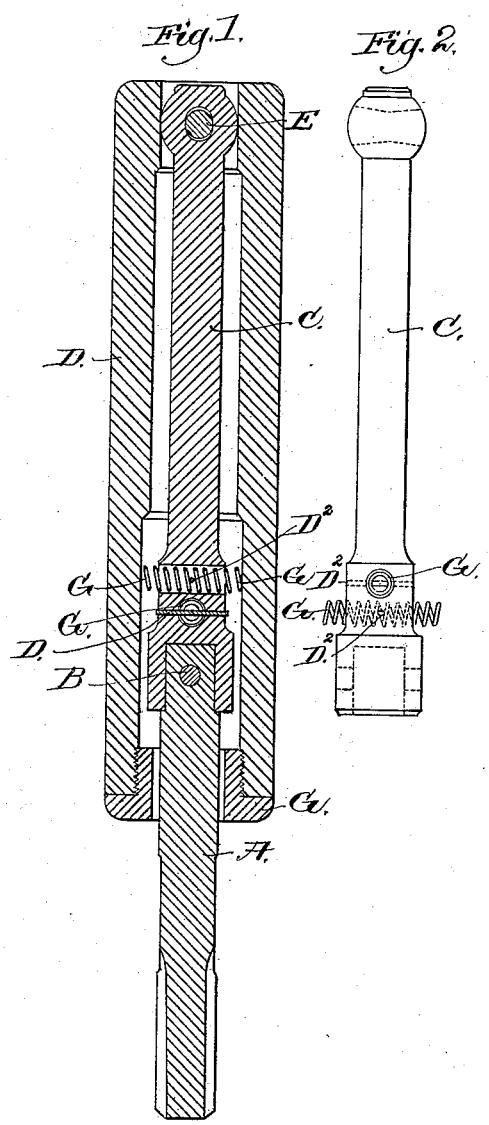

UNITED STATES PATENT OFFICE.

WILLIAM L. GROUT AND EDWARD L. BOWERS, OF ORANGE, MASSACHUSETTS.

DRILL OR REAMER HOLDER.

SPECIFICATION forming part of Letters Patent No. 376,476, dated January 17, 1888.

Application filed August 4, 1887. Serial No. 246,118. (No model.)

*To all whom it may concern:*

Be it known that we, WILLIAM L. GROUT and EDWARD L. BOWERS, of Orange, county of Franklin, State of Massachusetts, have invented an Improvement in Drill or Reamer Holders, of which the following description, in connection with the accompanying drawings, is a specification, like letters on the drawings representing like parts.

In working metal drilled holes have frequently to be reamed, the object being to produce a hole as truly straight and cylindrical as possible; but with reaming-tools and holders as now made this is very difficult, because the reaming-tool is held rigidly in the spindle which rotates it and the spindle rotates in fixed bearings, and as a result any variation from a straight line is reproduced and increased by the reamer. The reamer enters a previously-bored hole, and to insure the straight passage of the reamer through the said hole, notwithstanding the rotating shaft of the tool and its bearings are not perfectly straight, we have provided a compound holder composed, essentially, of a sleeve and a loosely-held shank therein to which the reamer is attached.

Our invention consists in a tool-holder composed of a sleeve and a pivoted shank to which is attached a reamer or tool which it is desired shall pass straight through the material.

Figure 1 in longitudinal section shows one of my improved tool-holders; and Fig. 2, an elevation of the shaft removed from the sleeve, the tool being omitted.

The reamer A is attached by bolt or screw B to a socketed part of the shank C, extended through the sleeve-spindle D, to which it is loosely connected by a stud or pin, E, the pivoted end of the shank being preferably rounded or of globular form, as shown, so that the shank may rock or turn; but instead of the particular form of joint shown we may use any other well-known form of ball or equivalent joint.

In operation the sleeve D will be fitted into a bearing in the frame-work in which it is to be rotated, and the parts will be adjusted to the hole to be reamed, so that the reamer will enter the previously-drilled hole. It is desired that the reamer follow straight through the hole and be not made to tremble or gyrate by reason of any difference between the center of rotation of the sleeve and the reamer. This object is secured by the loose connection of the shank C at a distance from the reamer. To help keep the shank in central position and avoid jar we have cushioned the shank, as herein shown, by means of wire springs G, which extend centrally from pockets or holes in the shank in four directions.

We do not desire to limit our invention to the exact form of cushion shown, as instead we might use any of the form of cushions now commonly used in connection with spinning-machine spindles. The end of the sleeve is partially closed by means of an annular cap.

By holding the shank loosely in the rapidly-rotating sleeve the reamer may be fed through and ream out perfectly straight a previously-bored hole.

We do not desire to limit our invention to the exact form of reamer or tool A herein shown.

The springs G, as herein shown, are held centrally by a pin, $D^2$.

We claim—

1. The hollow sleeve or spindle D and tool, combined with the shank C, inserted within the said sleeve or spindle to carry the tool, the said shank being entirely within and loosely connected, substantially as described, with the said sleeve or spindle, for the purposes set forth.

2. The tool-carrying shank and the sleeve or spindle to which the said shank is loosely connected, combined with the springs or cushions, to operate substantially as described.

In testimony whereof we have signed our names to this specification in the presence of two subscribing witnesses.

WM. L. GROUT.
    EDWARD L. BOWERS.

Witnesses:
  H. S. DAWLEY,
  EDWARD WHITING.